May 7, 1935.    J. C. STEVENS    2,000,046
WATER LEVEL RECORDER
Filed June 16, 1931    4 Sheets-Sheet 1

Inventor
J. C. Stevens.
By Goldbug
Attorney

May 7, 1935. J. C. STEVENS 2,000,046
WATER LEVEL RECORDER
Filed June 16, 1931 4 Sheets-Sheet 2

Inventor
J. C. Stevens
By [signature]
Attorney

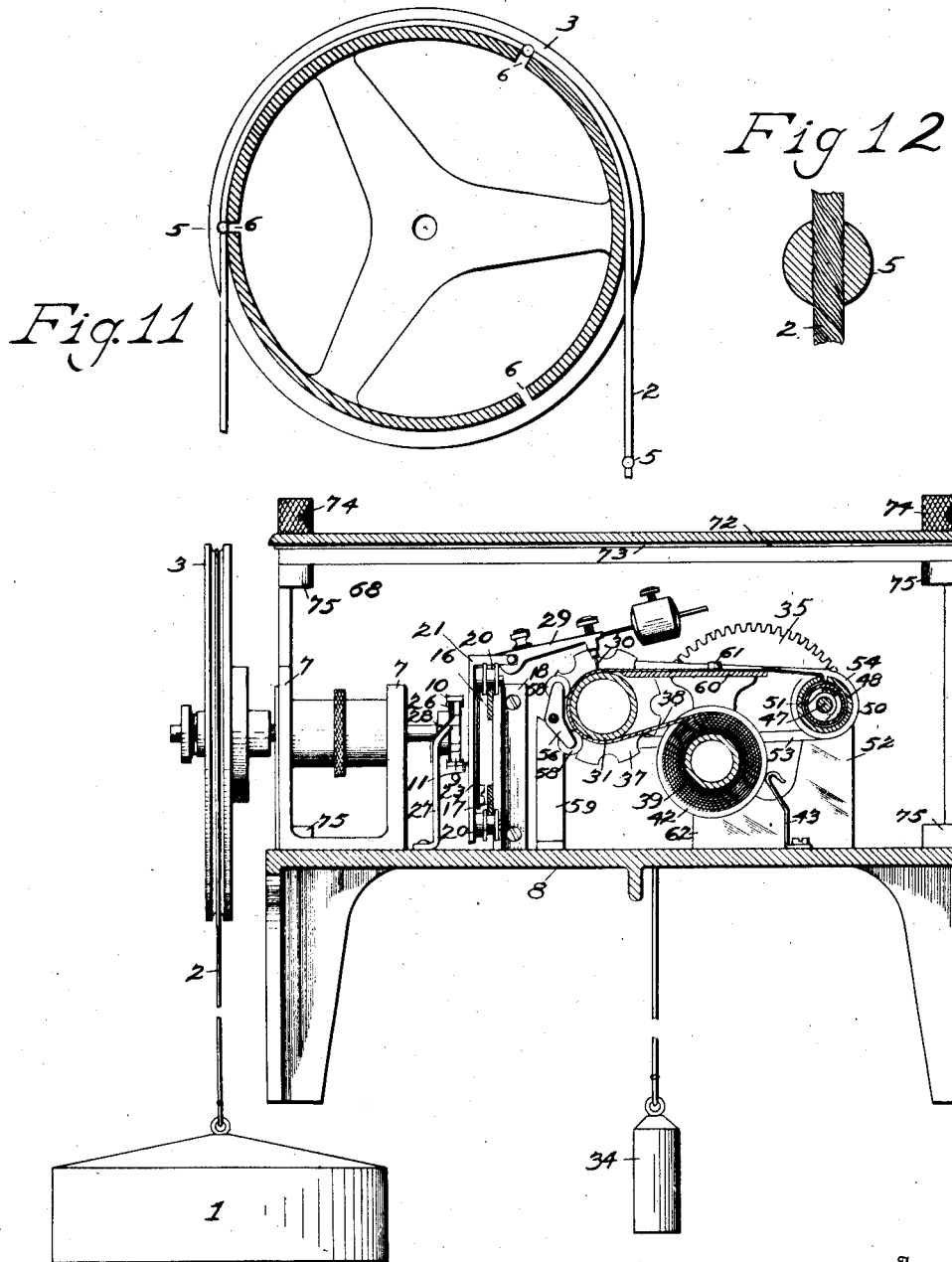

May 7, 1935.  J. C. STEVENS  2,000,046
WATER LEVEL RECORDER
Filed June 16, 1931  4 Sheets-Sheet 4
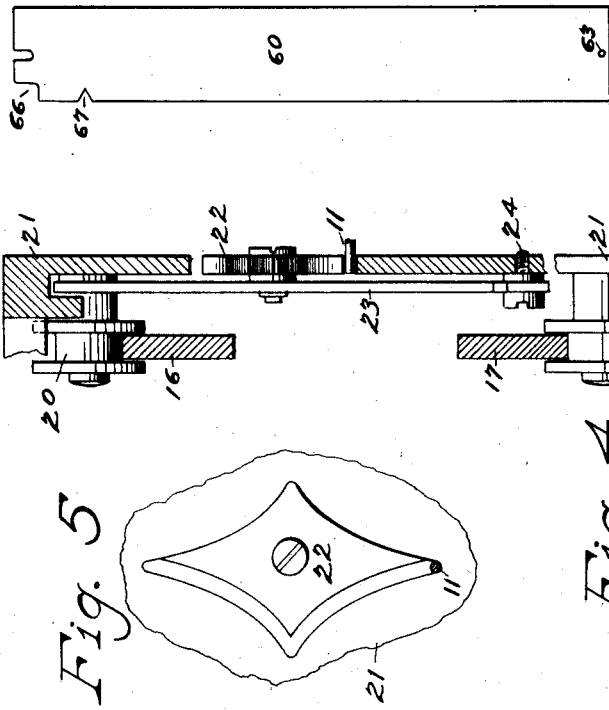
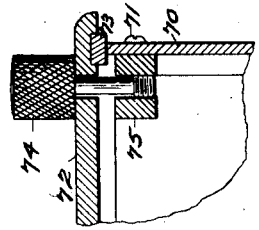
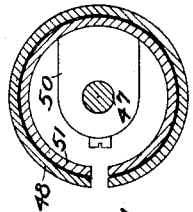
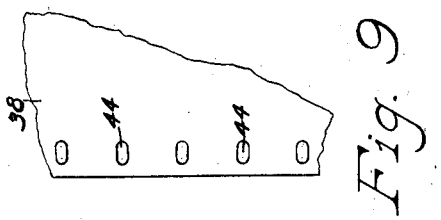
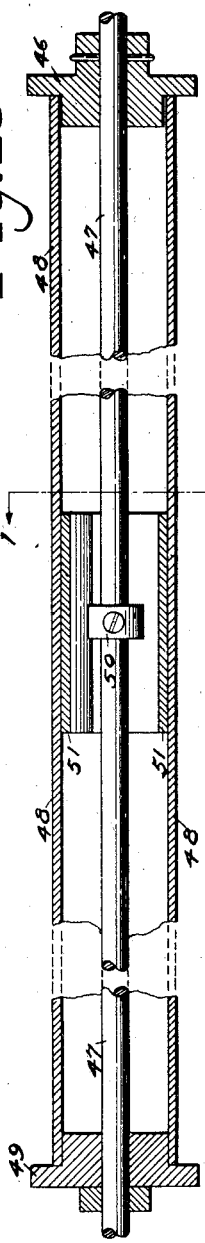
Inventor
J. C. Stevens
By [signature]
Attorney Patented May 7, 1935

2,000,046

UNITED STATES PATENT OFFICE 2,000,046

WATER LEVEL RECORDER

John C. Stevens, Portland, Oreg., assignor to Leupold, Volpel & Co., Portland, Oreg., a corporation of Oregon Application June 16, 1931, Serial No. 544,751

4 Claims. (Cl. 234—10)

My invention relates to water level recorders and particularly to a water level recorder in which a float operated recording pencil travels on a clock regulated strip of recording paper and furnishes a visible and permanent graph of changes in water or other liquid levels.

The particular objects of this invention are to manufacture a water level recorder in which the more delicate parts are hermetically enclosed; in which all slipping of the recording paper on the recording drum is eliminated; in which a novel takeup roller is employed; in which the recording carriage is provided with an improved reversing mechanism; in which a new paper positioner is used; in which a novel float line eliminates all slip and permits records of unusually large variation in water levels without appreciable error.

Other objects and advantages are to be found in the construction and arrangement of parts as will be described in the specification and particularly pointed out in the appended claims.

I attain these objects with the mechanism, illustrated in the accompanying drawings, in which:

Fig. 3 is a section through Fig. 1 along the line 3—3, but showing the recording paper, the table and the cover in place.

Fig. 4 is a vertical section through the recording carriage.

Fig. 5 is a front view of the cycloidal cam in the recording carriage.

Fig. 6 is a detail of the takeup roller.

Fig. 7 is a section through Fig. 6 along the line 7—7.

Fig. 8 is a detail of the joint between the side walls and the cover.

Fig. 9 is a detail of the recording paper.

Fig. 10 is a plan view of the table.

Fig. 11 is a detail of the sheave.

Fig. 12 is a detail of the float line.

Similar numerals refer to similar parts throughout the several views.

Figure 2:
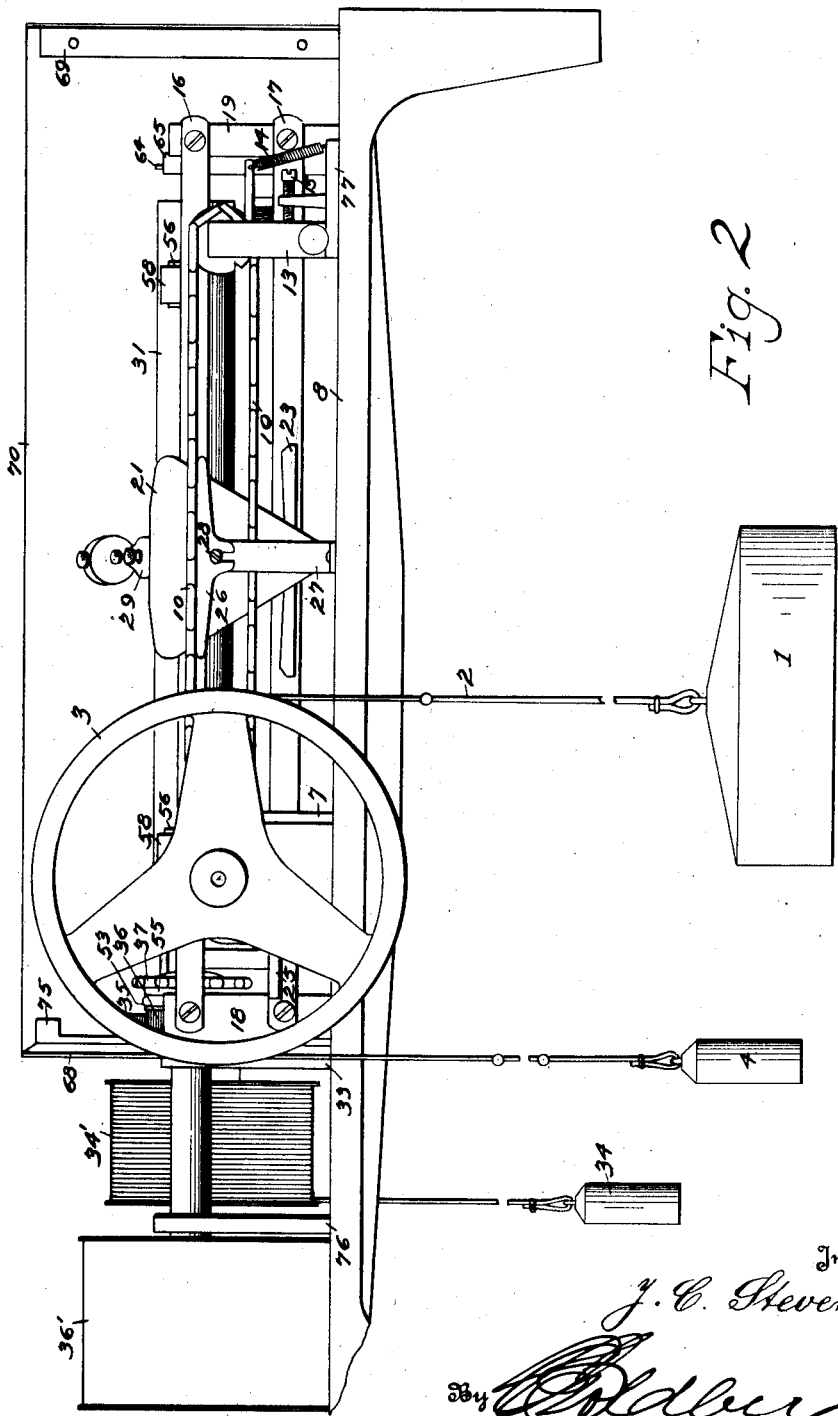
Fig. 2 is a front view of Fig. 1 with the front wall removed.

The float 1 in Fig. 2 rises and falls with the water level. The float line 2 leads over a sheave 3 and is held thereon by a weight 4 at the other end of the float line 2. In order to record variations of 125 feet or more in water levels, without appreciable error due to excessive weight and to slipping of the float line 2, the latter is composed of a very thin and strong cable, on which are threaded small brass balls 5 (Fig. 12); after the latter are properly spaced, they are compressed in a spherical die so as to retain their places on the float line 2 by friction; the sheave 3 as seen in Fig. 11 is provided with corresponding recesses or holes 6 for the reception of the brass balls 5, so that the light weight and flexibility of a cable is combined with the positive driving power of a chain and sprocket wheel.

Figure 1:
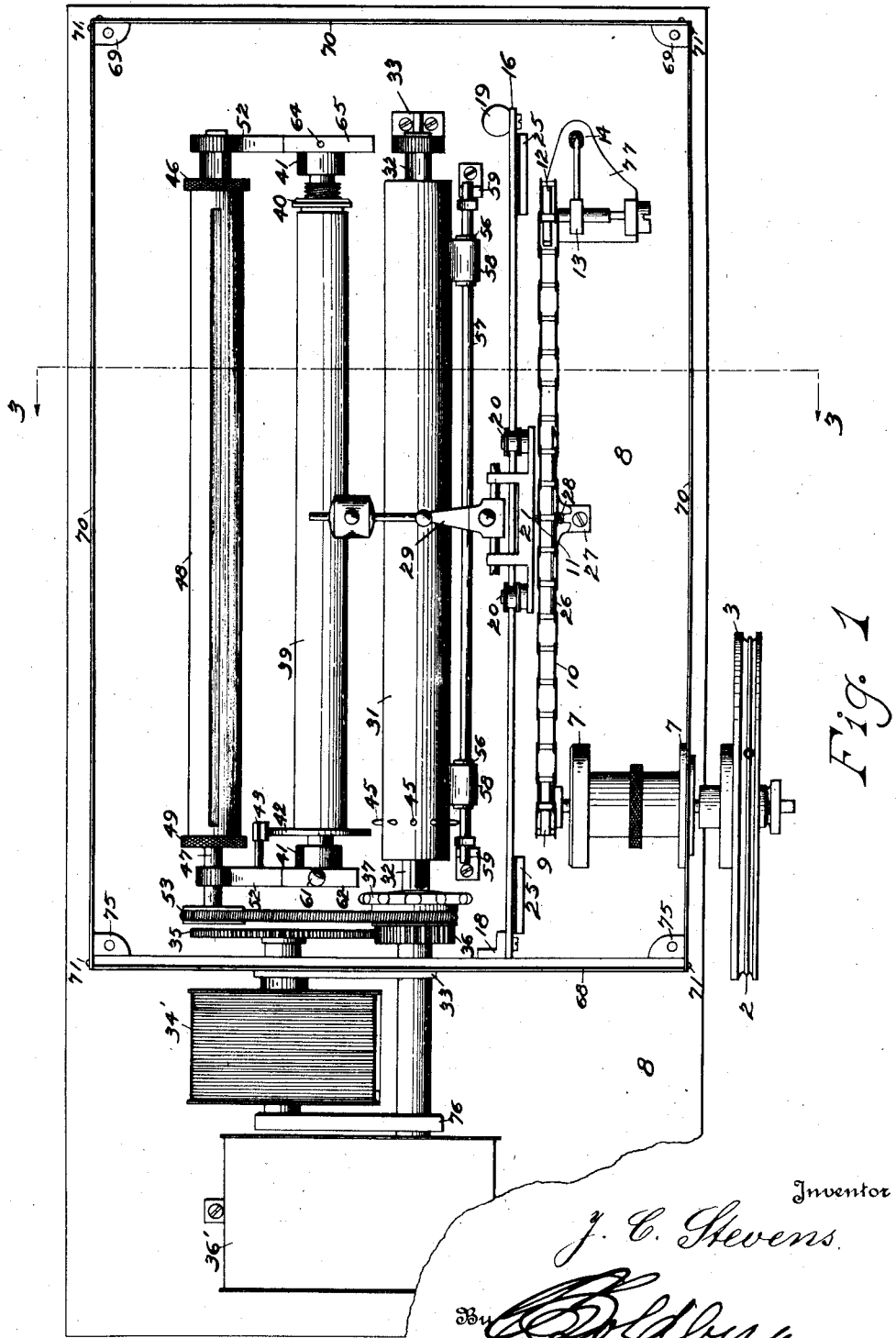
Fig. 1 is a plan view of the entire mechanism with the cover, the table, and the recording paper removed.

Referring to Fig. 1 the sheave 3 is supported in suitable bearings 7 on the base plate 8, and drives a sprocket wheel 9 and an endless sprocket chain 10 to which latter is attached a laterally projecting carrier pin 11. The other end of the sprocket chain 10 is supported by a sprocket wheel 12 on the oscillating arm 13 and held under constant tension by a spring 14. A set screw 15 pressing against the oscillating arm 13 reduces excessive tension in the sprocket chain 10 and thereby eliminates as much as possible any lag due to friction.

Parallel to the sprocket chain 10 are two rails 16 and 17, one above the other and mounted on suitable supports 18 and 19. Mounted on the rails 16 and 17 by the wheels 20 is a recording carriage 21 which is drawn back and forth by the carrier pin 11 in the sprocket chain 10. Since the carrier pin 11 is sometimes in the upper and sometimes in the lower run of the sprocket chain 10 yet the movement of the recording carriage 21 should proceed at an even ratio to the lateral limits of the graph and the recording carriage then positively be carried on its backward course, the carrier pin 11 is guided in the recording carriage 21 by a cycloidal cam 22 of which the details are shown in Figs. 4 and 5.

This cycloidal cam 22 is attached to the stem of an inverted T-lever 23 which latter is pivotally attached to the back of the recording carriage 21 as shown at 24. The two horizontal arms of the T-lever 23 are actuated by the switch plates 25 (Fig. 1) at each end of the lower rail 17 in the following manner: as the left arm of the T-lever 23 (Fig. 2) slides under the left switch plate and is depressed thereby, the cycloidal cam 22 is thrown toward the left of the opening in the recording carriage 21, and leaves at the right hand side a cycloidal path in which the carrier pin 11 can complete its motion around the sprocket wheel 9 from the bottom to the top and then continue its travel on the upper run of the sprocket chain. A reverse motion of the cycloidal cam 22 is produced when the right arm of the T-lever 23 slides under and is depressed by the switch plate 25 on the right hand side of the rail 17.

It is clear that any sagging of the upper run of the sprocket chain 10, if the carrier pin 11 happens to be in the upper run, would permit said carrier pin to descend more or less into the cycloidal curve and thereby to introduce errors in the record. To avoid any such contingency, the upper run of the sprocket chain 10 is upheld by an adjustable cross arm 26 on the stand 27 which latter is mounted on the base plate 8. The cross arm 26 is held in adjusted position by a set screw 28.

The weighted pencil holder 29 (Fig. 3) presses the stylus or pencil 30 against the recording drum 31. This recording drum is mounted on a shaft 32 (Fig. 1) in suitable bearings 33 and driven by a weight 34 on the cable drum 34' through the intermediacy of a large gear 35 on the cable drum 34' and a small gear 36 on the recording drum 31. The rotation of the small gear 36 is however regulated by a suitable clock mechanism 36'. It should further be stated that connection between the small gear 36 and the recording drum 31 is not rigid but rather by friction, so that the recording drum 31 can be independently rotated by means of a hand wheel 37 which is firmly connected with the recording drum 31. This permits the operator to set the recording paper 38 on the recording drum 31 on any desired starting line under the recording pencil 30.

The supply roller 39 which receives a roll of recording paper 38 is provided with a lock nut 40 at one end, wherewith the roll of recording paper 38 can be held tightly on the supply roller 39. The latter is removably mounted in suitable bearings 41 and provided with a flange 42. A spring 43 mounted on the base plate 8 and pressing against the periphery of the flange 42 acts as a brake to prevent the recording paper from being accidentally unwound. The recording paper 38 is perforated at one edge as shown at 44 in Fig. 9, and passed around the recording drum 31 from the bottom to the top as shown in Fig. 3. Spines 45 on the recording drum 31 in Fig. 1, corresponding to the perforations 44 in the paper 38 prevent all possibilities of slipping between the recording drum 31 and the recording paper 38. From the recording drum 31 the recording paper 38 is led to, and wound up by, the takeup roller, the details of which are illustrated in Figs. 6 and 7. As illustrated there the hub 46 is firmly mounted on the take-up roller shaft 47, and a slotted tube 48 is firmly mounted on a hub 49 at the other end of the take up roller shaft 47. The two hubs 46 and 49 can thus be rotated independently of each other. Firmly mounted on the takeup roller shaft 47 within the slotted tube 48 is an arm 50 which supports a slotted sleeve 51 concentrically to the slotted tube 48. If the two slots in the sleeve 51 and the tube 48 be brought in registry, then a strip of paper 38 be inserted into the slots, and one hub be turned while the other is held rigidly, the paper will be clamped and held firmly between the tube 48 and the sleeve 51. The takeup roller shaft 47 is mounted in suitable bearings 52 and driven by a spring belt 53 which connects the small pulley 54 on the takeup roller shaft 47 with a larger pulley 55 on the recording drum shaft 32. The reason for employing pulleys 54 and 55 of different diameters and a spring belt 53 between the two pulleys is that the speed of the takeup roller should be slightly faster than that of the paper 38 as it comes from the recording drum 31. Thus the paper 38 will be always kept taut, yet excessive or tearing strain will be avoided by the slipping of the spring belt 53 on the pulleys 54 and 55. As the diameter of the recording paper 38 on the takeup roller increases more slippage of the spring belt 53 on the pulleys 54 and 55 will be required.

To hold the recording paper 38 evenly against the recording drum 31 there is employed a paper positioner with a knee bracket 56 freely mounted at each end of the shaft 57. Idle rollers 58 at both terminals of each knee bracket press against the paper 38; and the shaft 57, being mounted on an inclined plane 59 at each end, of said shaft 57, will hold the idle rollers 58 by gravity against the recording paper 38 on the recording drum 31.

For the purpose of making desired notation on the recording paper 38, a table 60 is placed under the paper as shown in Fig. 3. This table 60 must be removably mounted in order to permit access to the supply roller 39 underneath. The table 60 is therefore slotted at one end as shown in Fig. 10 and slipped under the head 61 in the bearing wall 62 (Fig. 1). The other end of the table 60 is perforated as at 63 (Fig. 10) and merely dropped over a pin 64 in the bearing wall 65 (Fig. 1). The cut-away portion 66 in the slotted end of the table furnishes clearance for the hand wheel 37, and the triangular cut 67 adjacent to the cut-away portion 66 furnishes the clearance for the spines 45 on the recording drum 31.

To enclose the vital parts of the recording mechanism in a weather proof manner there are a fixed wall 68 and two pillars 69 mounted on the base plate 8. The remaining three walls 70 are held with moisture proof joints to the fixed wall 68 and to the pillars 69 by means of screws 71 and the opening at the top is then enclosed by a cover 72 which latter is provided with grooves for the rubber strips 73. These rubber strips 73 press against the top edges of the wall 68 and 70 and thus provide a tight seal. The cover 72 is held tightly to the top of the walls 68 and 70 by means of hand screws 74 which enter the top of the pillars 69 and the lugs 75 on the fixed wall 68. Although the hand screws 74 are also screwed into the cover 72 itself, the upper portion of the threads on the hand screws 74 is cut away so that the cover 72 can be lifted as soon as the hand screws 74 have been freed from the lugs 75 and the pillars 69, so that there is no possibility of mislaying the handscrews 74 unless they also be screwed out of the cover 72.

The numeral 76 (Fig. 1) indicates the bearing wall for the cable drum 34' and the clock shaft which is a continuation of the recording drum shaft 32. The numeral 77 (Fig. 1) indicates the supporting base for the sprocket chain tensioning device, of which the oscillating arm 13 is a conspicuous member.

In operation, the weight is wound up on the cable drum; the supply roller with its roll of recording paper is placed in its bearings; the recording paper is led first under and then over the recording drum, care being taken that the spines in the recording drum enter the perforations in the recording paper; the table is placed in position; the paper is drawn over the table and clamped tightly in the takeup roller; the hand wheel on the recording drum is then turned slightly forward or backward to bring the proper starting line on the recording paper under the recording pencil; the cover is screwed on tightly to the top of the walls and the apparatus may be left exposed to the elements without any further care until the cable drum needs rewinding or the recording paper replenishing.

I claim:

1. In a water level recorder, the combination of a base plate, a float operated sprocket chain mounted on the base plate, a carrier pin projecting laterally from the sprocket chain, rails mounted on the base plate parallel to the sprocket chain, a switch plate at each end of one rail, a recording carriage movably mounted on the rails, an inverted T-lever pivotally mounted at the back of the carriage, a cycloidal cam pivotally mounted on the stem of the T-lever and entering a corresponding opening in the recording carriage, the horizontal arms of the T-lever being actuated by the switch plates on the rail to produce a cycloidal path for the reception of the carrier pin.

2. In a water level recorder, the combination of a base plate, rails mounted on the base plate, switch plates affixed to the rails, a recording carriage movably secured on the rails, a lever pivotally attached to the recording carriage, a cycloidal cam pivotally affixed to the lever and operably mounted in the recording carriage, said lever being actuated by the switch plates on the rail.

3. In a device of the class described a recorder carriage supported for reciprocating motion, a pin entering an opening in said carriage to control the motion thereof, a cam positioned in the said opening to govern the motion of the pin within the opening, a lever carrying said cam and pivoted to the carriage, and means for operating the lever to position the cam within the opening in accordance with the position of the carriage.

4. In a device of the class described a recorder carriage supported for reciprocating motion, a pin entering an opening in said carriage to control the motion thereof, a one piece cam positioned in the said opening to form with said opening a cycloidal cam slot to govern the motion of the pin within the opening and means for positioning the cam within the opening in accordance with the position of the carriage.

JOHN C. STEVENS.